May 23, 1961 A. F. STEGELMAN 2,984,973
LIQUID-SOLID BIPROPELLANT ROCKET
Filed Dec. 8, 1958
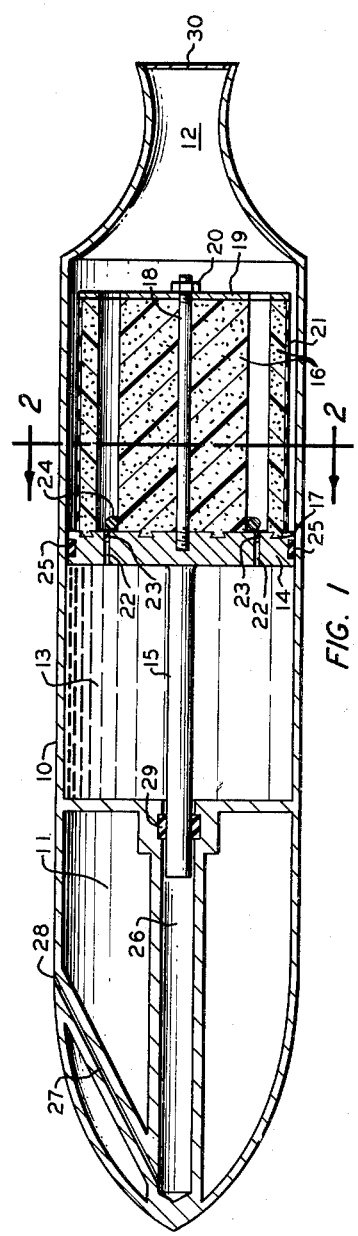
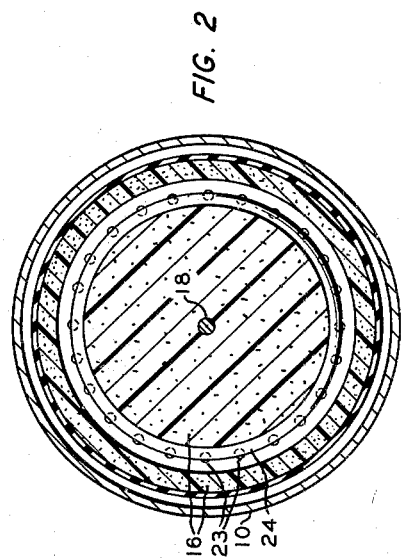
INVENTOR.
A.F. STEGELMAN
BY Hudson and Young
ATTORNEYS

United States Patent Office 2,984,973
Patented May 23, 1961

2,984,973
LIQUID-SOLID BIPROPELLANT ROCKET

Albert F. Stegelman, Bartlesville, Okla., assignor to Phillips Petroleum Company, a corporation of Delaware Filed Dec. 8, 1958, Ser. No. 779,022

3 Claims. (Cl. 60—35.6)

This invention relates to a rocket motor and more particularly to an improved hybrid rocket motor wherein a fluid propellant and a solid propellant are used simultaneously. In one aspect this invention relates to an improved hybrid rocket motor wherein the pressure generated in the combustion chamber is utilized to introduce the liquid propellant into the combustion chamber. In another aspect this invention relates to an improved hybrid rocket motor wherein the relationship of the solid propellant, the liquid propellant, and the communicating passageways remains constant during the reaction period.

It is known to operate a rocket motor with a solid propellant charge and to augment the solid propellant with a source of fluid fuel or oxidizer to supply a deficiency of the solid propellant. These rocket motors are generally referred to as hybrid rocket motors. The principal purpose of a hybrid rocket motor is to provide a means for controlling the ratio of fuel to oxidizer present in a solid propellant-containing combustion zone so that the burning rate can be set at a desired and useful level. For maximum performance control of a hybrid rocket, this presupposes that the solid propellant will be deficient in either oxidizer or fuel and that the fluid will supply the component in which the solid propellant is deficient. Thus the fuel-oxidizer ratio in the combustion zone can be operated fuel-rich, oxidizer-rich, or stoichiometric as the occasion requires. The solid charge can be deficient in fuel or oxidizer only to the extent that maximum combustion efficiency is not attained by the solid charge alone or can be deficient in fuel or oxidizer to the extent that the solid charge will not provide sustained combustion in the absence of the augmenting fluid. Broadly, the invention contemplates an improved method and means for supplying a fluid propellant component onto the surface of a solid propellant component throughout the combustion period of a rocket motor utilizing a solid propellant and a fluid propellant. The only moving mechanism in the rocket motor is the simple piston. The solid propellant charge is secured to the face of this piston and, since the fluid propellant inlets are positioned in the face of the piston, the relationship of the solid propellant charge and the fluid inlets remains constant throughout the combustion period. The system of the present invention provides mechanical structure that improves combustion in a bipropellant rocket system and which provides advantages in that the mechanism is greatly simplified and requires no additional power source, but operates solely with the reaction chamber pressure.

Figure 1 of the drawing presents a simplified schematic illustration, in cross section, of a preferred embodiment of the present invention; and Figure 2 is a sectional view taken along the lines 2—2 of Figure 1.

It is an object of this invention to provide an improved rocket motor wherein a solid propellant is employed and a liquid is employed in conjunction with the solid propellant to augment the burning characteristics of the solid propellant. It is therefore an object of this invention to provide an improved rocket motor wherein a liquid oxidizer is supplied to a fuel-rich solid propellant in the combustion chamber of the rocket. It is also an object of this invention to provide an improved rocket motor wherein an auxiliary liquid fuel is supplied to the combustion chamber wherein an oxidizer-rich solid propellant is utilized. It is an object of this invention to provide a simplified means for supplying a liquid propellant component to the burning surface of a solid propellant in a combustion chamber. Other objects and advantages will become apparent to one skilled in the art upon study of the present disclosure.

Referring now to the drawing and particularly to Figure 1, the rocket motor illustrated comprises a casing 10, forward payload section 11, nozzle section 12, liquid container 13, piston 14 connected to piston rod 15, and a solid propellant charge 16 secured to the face of piston 14. The solid propellant charge 16 is secured to the face of piston 14 by conventional adhesives reinforced by the undercut sections 17 and retained in position by the rod 18 which is secured to piston 14 and passes through the propellant charge 16 and has a retaining plate 19 secured to rod 18 by means of nut 20. The periphery of propellant charge 16 is protected by restrictor 21 so that burning of the propellant surface is confined to the annulus between the ring and rod portion of propellant charge 16. A plurality of orifices 22 extends through a piston 14 so as to provide communication between the interior of container 13 and the annulus in a propellant charge 16. These orifices are sealed with a fusible metal at 23 prior to operation of the rocket. Ignition is obtained by ring squib 24 positioned in the annulus of the propellant charge 16 and performs the dual function of melting the fusible metal plugs 23 and igniting the solid propellant charge 16. The ring squib can comprise a powder charge ignited by electrical resistance wires connected to an electrical power source (not shown). Ring seals 25 provide sealing contact between the piston 14 and the casing 10.

Piston rod 15 travels in conduit 26 which is in communication with the atmosphere by means of vent tube 27. The opening of vent tube 27 is sealed by a thin diaphragm 28 which is ruptured by pressure generated upon operation of piston 14. Seal 29 maintains sealing contact between piston rod 15 and the conduit 26 to prevent leakage of liquid from container 13. Nozzle section 12 is sealed by diaphragm 30 which is ruptured by pressure in the combustion chamber upon ignition of the solid propellant 16.

The operation of the rocket is described in the following manner. Ring igniter 24 which comprises an electric squib connected to a source of energy is ignited and substantially instantaneously melts the fusible metal plugs 23 in the orifices 22 and simultaneously ignites the solid propellant charge 16 thereby producing pressure in the combustion chamber and rupturing the sealing disc 30 so as to exhaust gases therefrom and provide forward thrust to piston 14. Liquid from container 13 is thrust through orifices 22 and as the piston rod 15 progresses through the conduit 26 the pressure resulting in conduit 26 and vent tube 27 ruptures the diaphragm 28 so as to provide communication between the end of piston rod 15 and the atmosphere. Through the operation of the rocket motor the piston 14 travels forward forcing liquid through the orifices 22 and onto or adjacent the burning surfaces of solid propellant charge 16. In this manner the component in which the solid propellant charge is deficient is supplied by the liquid throughout the burning period of the rocket motor because the orifices through which the liquid is introduced remain in substantial fixed relationship to the solid propellant throughout the burning period.

The orifices 22 are so distributed and positioned that the liquid is caused to contact substantially all the burning surfaces of the solid propellant. The orifices are further designed to discharge the liquid at the required rate of a predetermined pressure drop $P_n$. Therefore, when the difference in pressure between the liquid storage chamber and the reaction chamber is $P_n$, all of the stored liquid will pass through the orifices during the time required to burn the solid propellant.

Assuming that the end of the piston rod 15 is exposed to the atmosphere, then the gauge pressure (over atmospheric pressure) will be greater in the liquid chamber than in the reaction chamber because of the area of the small end of the piston. Therefore, the pressure drop through the injector nozzles $P_n$ will be the pressure of the reaction chamber multiplied by the ratio of the end of the piston rod to the area of the piston 14, or $$P_n = P_r \cdot \frac{a}{A}$$

where $P_r$ is the reaction chamber pressure, $a$ is the area of the piston rod, and A is the area of the piston 14.

In a practical design, the area of the end of the piston rod should be increased somewhat to compensate for the effect of acceleration upon the mass of piston and solid propellant, minus the effect of acceleration on the liquid, as well as frictional losses in the piston action.

The constantly increasing combustion chamber volume, as a result of the movement of piston 14, results in more stable combustion because fundamental vibrations are dampened by a changing combustion chamber volume. Thus the design and mechanical operation of the rocket motor contribute to an improvement in the efficiency of the combustion of the propellant materials.

The solid propellant charge can be an oxidizer-rich solid, such as pressed ammonium nitrate or pressed ammonium perchlorate, in which case the augmenting fluid propellant will be a fuel component such as gasoline, kerosene, any of the known jet fuel compositions, or other liquid hydrocarbons suitable as a fuel when combined with a source of oxygen.

The solid propellant charge can be a fuel-rich solid such as a mixture of a solid oxidizer such as ammonium nitrate or ammonium perchlorate, together with a rubbery binder material such as a copolymer of a conjugated diene and a heterocyclic nitrogen base, as described in copending application, Serial No. 502,154, filed April 18, 1955. Other fuel-rich solid propellants include ammonium nitrate with an asphalt binder; ammonium nitrate or ammonium perchlorate with various binders such as polysulfide rubber, polyvinyl chloride, and the like; and nitroguanidine, sodium nitrate, or potassium nitrate with suitable binding materials such as those set forth above. Other fuel-rich solid propellants include a pressed charge of an organic nitrate or an organic perchlorate such as diisopropylamine nitrate; diisopropylamine perchlorate; or N,N,N',N'-tetramethylbutane-1,3-diaminedinitrate. The fuel-rich solid propellant charge also can be a high energy material such as a boronperchlorate charge or other like metals or other light metal hydrides. The fluid oxidizer for use with the fuel-rich solid propellants will be an oxygen containing fluid such as nitric acid, tetranitromethane, hydrogen peroxide, liquid fluorine, and the like.

Composite solid propellant compositions such as those comprising a solid inorganic oxidizing salt and a rubbery binder comprising organic materials such as hydrocarbon compounds, and derivatives of hydrocarbon compounds, are usually deficient in oxygen because of the poor physical characteristics of such mixtures which contain a stoichiometric ratio of oxidizer to fuel. The stoichiometric balance is usually sacrificed in order to obtain a composition having the required physical characteristics with respect to tensile strength, impact resistance and extrudability. The practice of this invention is particularly applicable to such propellant compositions.

The solid charge can be in the form of a rod and ring, as illustrated, or can be an internal-burning, external-burning hollow cylinder, or a solid cylinder containing a plurality of longitudinal perforations, or other configuration. The fluid nozzles will, in any case, be positioned so as to introduce fluid to the burning surface of the solid charge.

It will be appreciated by those skilled in the art that materials which are subjected to the high temperature of the burning propellant will be constructed of materials capable of withstanding such temperatures or will be adequately insulated. Restrictor materials used to control the burning area of the solid propellant will usually provide sufficient insulation to ordinary metals used for construction of rocket motor elements.

Reasonable variations and modifications are possible within the scope of the present disclosure without departing from the spirit and scope of the invention.

That which is claimed is:

1. A rocket motor comprising a casing; a payload section disposed in the forward end of said casing and sealing said forward end; an exhaust nozzle in the aft end of said casing; a piston disposed in said casing and forming a substantially fluid-tight container between said piston and said payload section and a combustion chamber between said piston and said exhaust nozzle; a solid propellant charge disposed in said combustion chamber and bonded to said piston; a retaining plate disposed on the end of said solid charge opposite said piston; a support rod secured to said plate and said piston and passing through said solid charge; a piston rod connected to said piston opposite said solid charge and communicating with the atmosphere; and means to ignite said solid charge.

2. A rocket motor comprising a casing; a payload section disposed in the forward end of said casing and sealing said forward end; an exhaust nozzle in the aft end of said casing; a piston disposed in said casing and forming a substantially fluid-tight container between said piston and said payload section and a combustion chamber between said piston and said exhaust nozzle; nozzle means sealed with fusible metal communicating between said container and said combustion chamber; a solid propellant charge disposed in said combustion chamber and bonded to said piston; a retaining plate disposed on the end of said solid charge opposite said piston; a support rod secured to said plate and passing through said solid charge; a piston rod connected to said piston opposite said solid charge and communicating with the atmosphere; and means to ignite said solid charge.

3. A rocket motor comprising a casing; a payload section disposed in the forward end of said casing and sealing said forward end; an exhaust nozzle in the aft end of said casing; a piston disposed in said casing and forming a substantially fluid-tight container between said piston and said payload section and a combustion chamber between said piston and said exhaust nozzle; a ring and tube solid propellant charge disposed in said combustion chamber and bonded to said piston; a perforated retaining plate disposed on the end of said charge opposite said piston; a support rod secured to said plate and passing through said charge; a plurality of passageways through said piston between said container and the annulus between the rod and tube of said charge; fusible plugs sealing said passageways; a piston rod connected to said piston opposite said charge and communicating with the atmosphere; and means to ignite said charge.

References Cited in the file of this patent

UNITED STATES PATENTS

| | | |
|---|---|---|
| 2,700,337 | Cumming | Jan. 25, 1955 |
| 2,753,801 | Cumming | July 10, 1956 |
| 2,791,883 | Moore et al. | May 14, 1957 |

OTHER REFERENCES

"A Quasi Morphological Approach to the Geometry of Charges for Solid Propellant Rockets: The Family Tree of Charge Designs," by J. M. Vogel, Jet Propulsion, February 1956, published by the American Rocket Society Inc.